United States Patent
Saitoh

[11] Patent Number: 5,965,042
[45] Date of Patent: Oct. 12, 1999

[54] METHOD AND APPARATUS FOR LASER MARKING WITH LASER CLEANING

[75] Inventor: Eri Saitoh, Chiba-ken, Japan

[73] Assignee: Miyachi Technos Corporation, Chiba-ken, Japan

[21] Appl. No.: 08/899,632

[22] Filed: Jul. 24, 1997

[30] Foreign Application Priority Data

Jul. 24, 1996 [JP] Japan .................................. 8-212133

[51] Int. Cl.$^6$ ............................................... B23K 26/16
[52] U.S. Cl. .............................. 219/121.68; 219/121.69; 219/121.76; 219/121.85
[58] Field of Search ........................ 219/121.61, 121.68, 219/121.69, 121.8, 121.85, 121.76, 121.77

[56] References Cited

U.S. PATENT DOCUMENTS

| | | | |
|---|---|---|---|
| 4,821,620 | 4/1989 | Azuma et al. ........................... | 427/556 |
| 5,198,843 | 3/1993 | Ito et al. .................................. | 347/256 |
| 5,262,470 | 11/1993 | Shimotsuma et al. .................. | 524/496 |
| 5,319,183 | 6/1994 | Hosoya et al. ...................... | 219/121.68 |

FOREIGN PATENT DOCUMENTS 63-237446  10/1988  Japan .
5-220588   8/1993  Japan .

OTHER PUBLICATIONS

Koren et al., "CO2 Laser Cleaning of Black Deposits Formed During the Excimer Laser Etching of Polyimide in Air," Applied Physics B, vol. 45, pp. 45–46, 1988.

*Primary Examiner*—Gregory Mills
*Attorney, Agent, or Firm*—Wenderoth, Lind & Ponack, L.L.P.

[57] ABSTRACT

To provide automatic, efficient and effective cleaning before or after laser marking, a control of a laser marker identifies a start number presented on a display and retrieves drawing data and drawing position data of the start number from a memory. The control determines an area to be cleaned from the retrieved drawing data and drawing position data (A3). Then, the control retrieves condition data, such as scanning speed, for an area sweeping-type cleaning mode. An area cleaning scan is performed in which a beam spot of YAG laser beam almost entirely scans or sweeps once an area of the workpiece (A5) surface to be cleaned (A5). The cleaning scan is repeated a predetermined number of times. By the projection of the YAG laser beam onto the area, workpiece surface materials are thinly and lightly melted or sublimated so that stains, such as dirt, are removed as if with an eraser.

14 Claims, 11 Drawing Sheets

| START NO. | DRAWING DATA | MARKING SPEED | Q-SWITCH FREQ (kHz) | LAMP CURRENT (A) | .... |
|---|---|---|---|---|---|
| 1 | Dm1 | 50 | 2.0 | 10.0 | : |
| 2 | Dm2 | 60 | 3.2 | 12.0 | : |
| 3 | Dm3 | 50 | 3.0 | 20.0 | : |
| . | . | . | . | . | . |
| 10 | Dm10 | 80 | 3.0 | 20.0 | : |

METHOD AND APPARATUS FOR LASER MARKING WITH LASER CLEANING

BACKGROUND OF THE INVENTION

The present invention relates to a scanning-type laser marking method and apparatus.

In the scanning-type laser marking method, a highly focused laser beam is projected onto a workpiece. The laser beam is swung by a scan mirror so that a beam spot of the laser scans a surface of the workpiece. A point on the workpiece surface where the laser beam spot hits is instantly metallurgically processed (melted, sublimated, discolored etc.,) by the laser beam energy. The laser beam scanning or drawing results in marking desired patterns, such as patterns of a character, figure or symbol, on the workpiece surface.

The laser marking method of scanning type has an advantage of non-contact marking of the workpiece. However, when a workpiece surface is dirtied or uneven, a mark pattern of poor quality, including broken or thinned portions, is formed.

In the prior art, an operator must pre-clean a surface of the workpiece, particularly a portion to be marked, if it has undesired impurities or unevenness. To this end, the operator uses cloth, tissue paper or the like, soaked in detergent or solvent such as acetone or ethanol, to wipe the workpiece surface, or uses a brush to scrub it.

A deeply etched pattern can be marked with higher energy of a laser beam. In such cases, metal particles or slag produced in the marking process remain in marked grooves, or burrs can be formed on groove edges. Since the results are unsatisfactory, the operator must post-clean the marked area and surrounding area by wiping or polishing.

The manual pre-cleaning and post-cleaning required in the prior art laser marking is, however, a painstaking labor on a part of an operator. In addition, filaments of a cloth or tissue paper may be caught in unevenness of a workpiece surface or burrs at the time of wiping or polishing. Sometimes, scratches may be formed on a workpiece surface (in particular, an area marked or to be marked) so that re-polishing is needed. Therefore, the prior art has problems of low productivity and difficult quality control.

SUMMARY OF THE INVENTION

With the above problems in mind, an object of the invention is to provide a method and apparatus for scanning-type laser marking which performs automatic, efficient and effective cleaning before and/or after the marking.

In accordance with an aspect of the invention, there is provided a method for marking desired patterns, such as those of a character, symbol and figure, on a surface of a workpiece by laser beam scanning. The method includes marking by projecting a laser marking beam so as to scan a surface of the workpiece to thereby mark the desired pattern thereon, and pre-cleaning by projecting a laser cleaning beam having energy lower than that of the marking beam before the marking step in such a manner that the cleaning beam scans a portion to be marked on the surface of the workpiece to thereby clean the portion to be marked.

The pre-cleaning may be performed by projecting the cleaning beam in such a manner that the cleaning beam scans the portion to be marked only.

In the alternative, the pre-cleaning may be performed by projecting the cleaning beam in such a manner that the cleaning beam scans a desired area including the portion to be marked.

A scanning speed of the cleaning beam may be chosen higher than that of the marking beam.

An intensity of the cleaning beam may be chosen lower than that of the marking beam.

In accordance with another aspect of the invention, there is provided a method for marking desired patterns, such as those of a character, symbol and figure, on a surface of a workpiece by laser beam scanning. The method includes marking by projecting a laser marking beam so as to scan a surface of the workpiece to thereby mark the desired pattern thereon, and post-cleaning by projecting a laser cleaning beam having energy lower than that of the marking beam after the marking step in such a manner that the cleaning beam scans a marked portion on the surface of the workpiece to thereby clean the marked portion.

The post-cleaning may be performed by projecting the cleaning beam in such a manner that the cleaning beam scans the marked portion only.

In the alternative, the post-cleaning may be performed by projecting the cleaning beam in such a manner that the cleaning beam scans a desired area including the marked portion.

A scanning speed of the cleaning beam is chosen higher than that of the marking beam.

An intensity of the cleaning beam is chosen lower than that of the marking beam.

In accordance with a further aspect of a the invention, there is provided a method for marking desired patterns, such as those of character, symbol and figure, on a surface of a workpiece by laser beam scanning. The method includes marking by projecting a laser marking beam so as to scan a surface of the workpiece to thereby mark the desired pattern thereon, pre-cleaning by projecting a laser cleaning beam having energy lower than that of the marking beam before the marking in such a manner that the cleaning beam scans a portion to be marked on the surface of the workpiece to thereby clean the portion to be marked, The method also includes post-cleaning by projecting a laser cleaning beam having energy lower than that of the marking beam after the marking in such a manner that the cleaning beam scans a marked portion on the surface of the workpiece to thereby clean the marked portion.

In accordance with another aspect of invention, there is provided an apparatus for marking desired patterns, such as those of a character, symbol and figure, on a surface of a workpiece by laser beam scanning. The apparatus includes a marking device for projecting a laser marking beam so as to scan a surface of the workpiece to thereby mark the desired pattern thereon, and a cleaning device for projecting a laser cleaning beam having energy lower than that of the marking beam so as to scan a portion for pattern on the surface of the workpiece to thereby clean the portion.

The apparatus may further include an inputting device for inputting data of an image and position of the pattern, area determining device for determining from the data input by the inputting device a desired area including the portion on the surface of the workpiece, and a scanner for projecting the cleaning laser beam so as to scan the desired area determined by the area determining means.

BRIEF DESCRIPTION OF THE DRAWINGS

The above and other objects and advantages of the invention will become more apparent from the following description taken in conjunction with the accompanying drawings in which.

DETAILED DESCRIPTION OF PREFERRED EMBODIMENT

The invention is now described in detail with respect to an embodiment taken in conjunction with the accompanying drawings.

Figure 1:
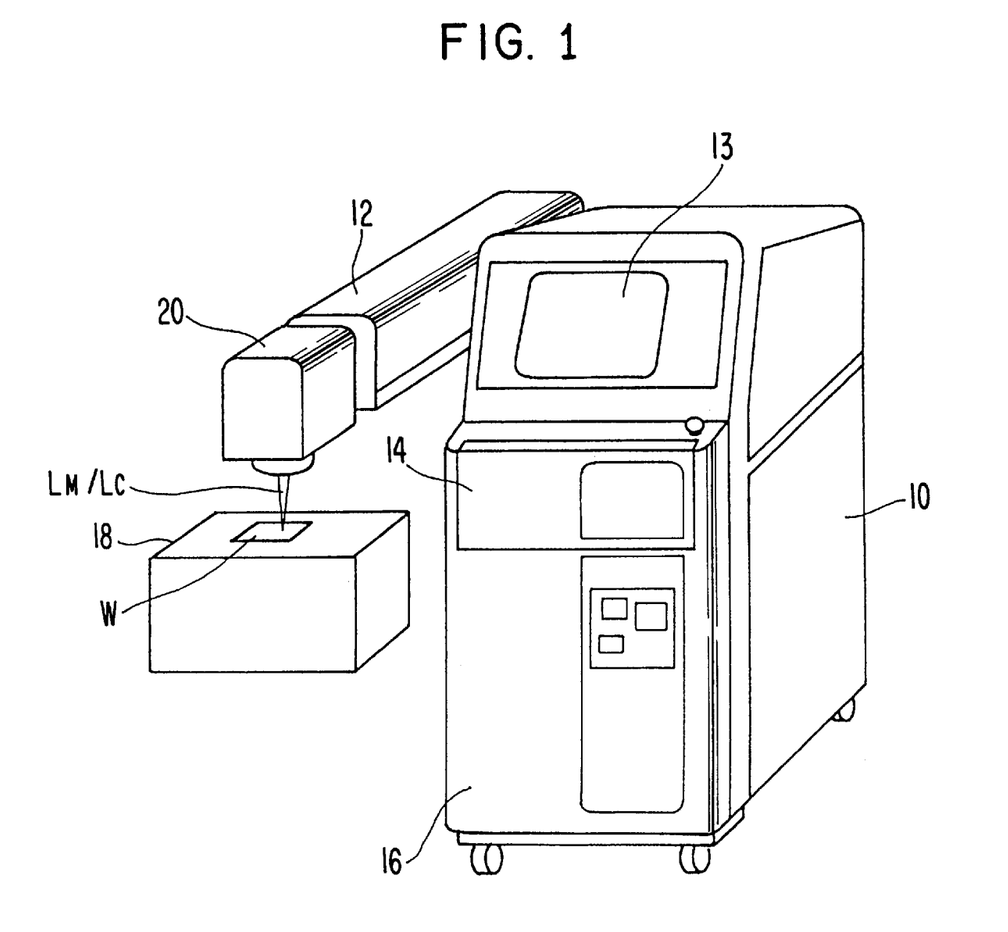
FIG. 1 is a perspective view of one embodiment of a scanning-type YAG laser marking apparatus.

FIG. 1 shows an external view of one embodiment of a scanning-type YAG laser marking apparatus. The YAG laser marking apparatus comprises a control power supply unit 10, laser oscillator unit 12 and scanning head 20.

The control power supply unit 10 has an upper compartment in which a display 13 is housed, a middle compartment (back of the front panel 14) where a keyboard and control board are housed and a lower compartment (back of the front panel 16) where a laser power supply circuit and a laser cooling apparatus are disposed. A control in the middle compartment generates and sends a scanning control signal to the scanning head 20 via a signal line (not shown). Scanning head 20 is disposed at the laser outlet of the laser oscillator unit 12. A workbench 18 is disposed right under the head 20. A workpiece W on the workbench 18 is marked by laser beam scanning.

Figure 2:
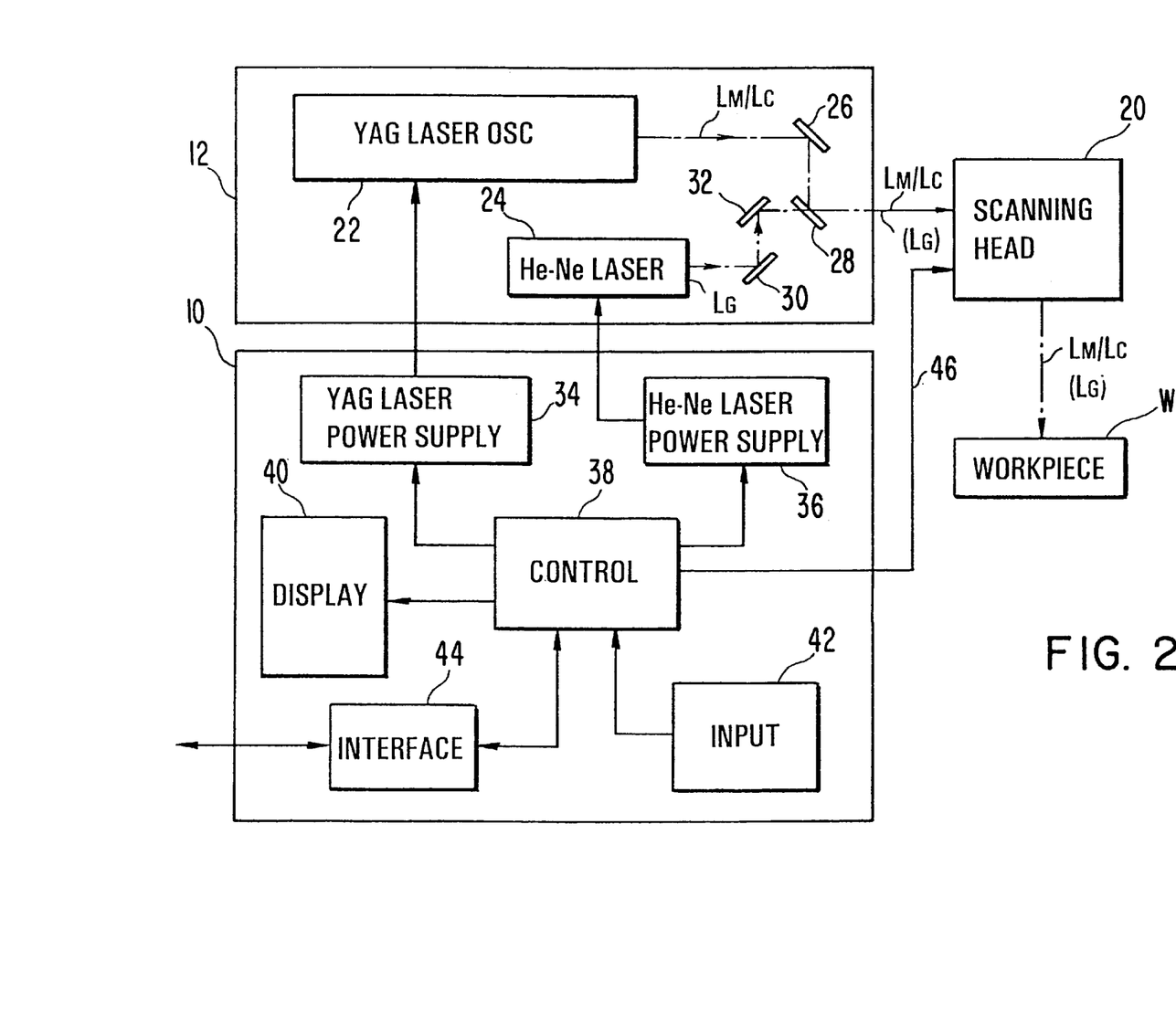
FIG. 2. is a block diagram showing an arrangement of a control power supply unit and laser oscillator unit of the embodiment.

FIG. 2 shows an arrangement of the control power supply unit 10 and the laser oscillator unit 12.

The laser oscillator unit 12 comprises a YAG laser oscillator 22 for selectively oscillating and outputting a YAG laser marking beam $L_M$ or YAG laser cleaning beam $L_C$, and a He—Ne laser 24 for generating a directional visible (e.g., red) guide beam $L_G$. The YAG laser beam $L_M/L_C$ emitted from the YAG laser oscillator 22 is bent at a right angle at a mirror 26, and further bent by right angle by a mirror 28 to the scanning head 20. The guide beam $L_G$ emitted from the He—Ne laser 24 is first bent at a right angle by a mirror 30, further bent by a right angle by a mirror 32 and transmitted through the mirror 28 to the scanning head 20.

The control power supply unit 10 includes a YAG laser power supply 34, He—Ne laser power supply 36, control 38, display 40, input unit 42, interface circuit 44, etc. The YAG laser power supply 34 supplies electric power to a laser excitation means (e.g., excitation lamp) in the YAG laser oscillator 22 under the control of the control 38. The He—Ne laser power supply 36 supplies electric power to a laser excitation means (e.g., laser tube) in the He—Ne laser 24 under the control of the control 38.

The display 40 visually displays an image on the display screen 13 in response to image data and display control signals from the control 38. The input unit 42 includes input devices such as keyboard, mouse and image scanner. The interface circuit 44 communicates data and control signals with an external apparatus (not shown).

The control 38, comprising a micro computer, processes data and controls system components according to predetermined software stored in a memory. In particular, the control 38 supplies a scanning control signal to a scanning driver circuit in the scanning head 20 via a signal line 46 to control the scanning operation of the head 20. A Q-switch is built in the YAG laser oscillator 22 to generate a pulsed laser beam with very high peak. The control 38 controls the Q-switch via a control line (not shown).

Figure 3:
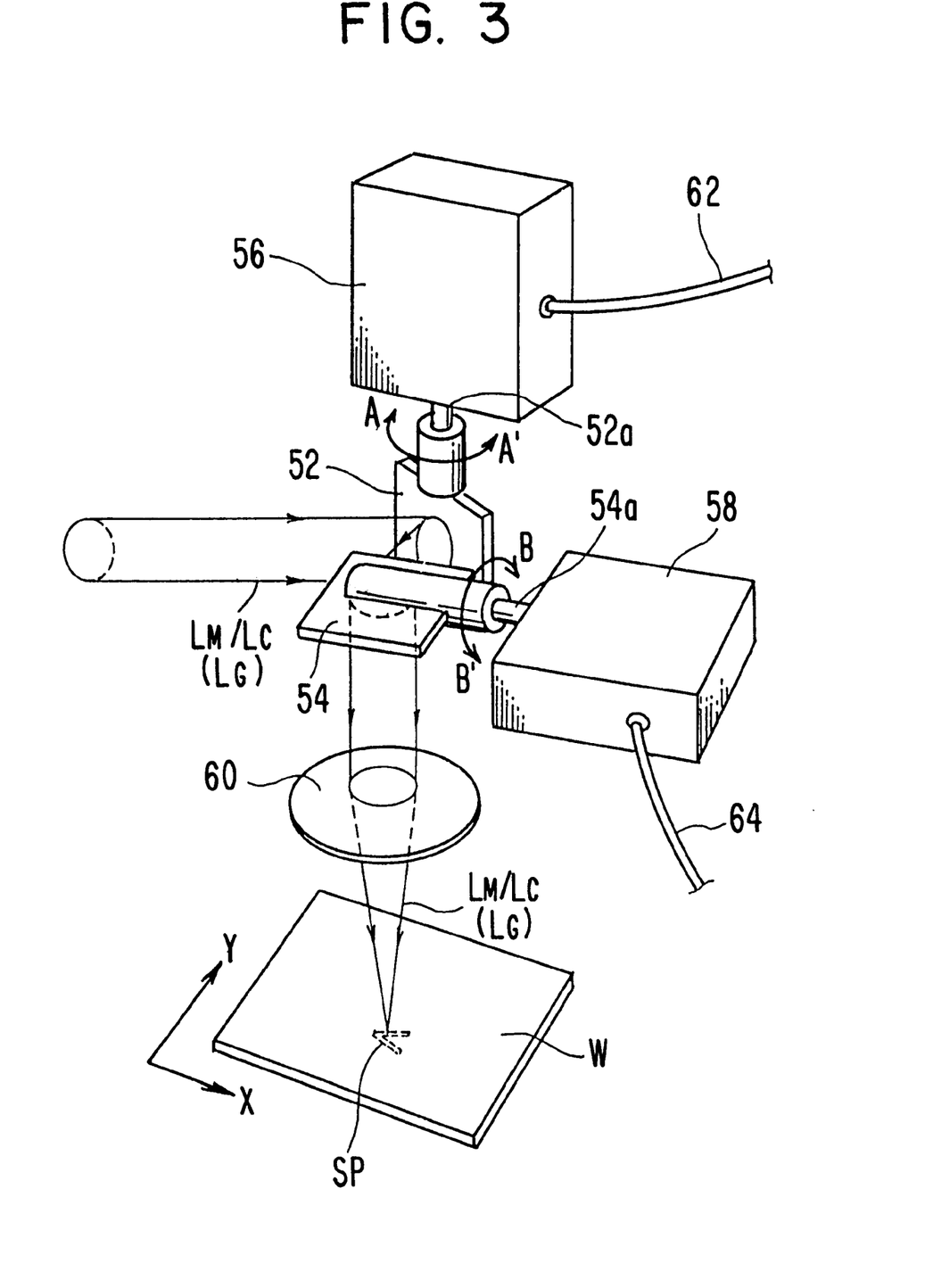
FIG. 3 is a view of a scanning mechanism in a scan head of the embodiment.

FIG. 3 shows a scanning mechanism in the scanning head 20. The scanning mechanism comprises an X axis scan mirror 52 and Y axis scan mirror 54 attached to the rotating shafts 52a, 54a, crossing at a right angle, and an X axis galvanometer 56 and Y axis galvanometer 58 for rotating or swinging the mirrors 52, 54.

The laser beam $L_M/L_C$ and guide beam $L_G$ from the laser oscillator unit 12 strike on the X axis scan mirror 52 in the scanning head 20. The X axis mirror 52 totally reflects them to the Y axis scan mirror 54 which totally reflects them onto a marking surface of the workpiece through an fθ lens 60 for beam projection. The position of a beam spot SP on the marking surface is determined by the swing angle of the X axis scan mirror 52 for X-direction, and determined by the swing angle of the Y axis scan mirror 54 for Y-direction.

The X axis scan mirror 52 is driven by the X axis galvanometer 56 so as to rotate or swing in the direction of an arrow A, A'. The Y axis mirror 54 is driven by the Y axis galvanometer 58 so as to rotate or swing in the direction of an arrow B, B'.

The X axis galvanometer 56 comprises a movable iron core (rotor) coupled to the X axis scan mirror 52, a control spring connected to the movable iron core and a driver coil disposed on a stator. An X axis galvanometer driver circuit (not shown) supplies a driving current corresponding to the X-direction scanning control signal to the driver coil in the X axis galvanometer 56 via an electric cable 62 so that the movable iron core (rotor) and the X axis scan mirror 52 integrally swing against the control spring to the angle specified by the X-direction scanning control signal.

The Y axis galvanometer 56 is similarly constructed. A Y axis galvanometer driver circuit (not shown) supplies a driving current corresponding to the Y-direction scanning control signal to the driver coil in the Y axis galvanometer 58 via an electric cable 64 so that the movable iron core (rotor) in the Y-axis galvanometer 58 and the Y-axis scan mirror 54 integrally swing to the angle specified by the Y-direction scanning control signal.

The YAG laser beam $L_M/L_C$ and/or guide beam $L_G$ from the laser oscillator unit 12 enter the scanning head 20 at appropriate timings. In synchronism, the galvanometers 56 and 58 respond to the X-direction and Y-direction scanning control signals to swing the X axis scan mirror 52 and Y axis scan mirror 54 to a predetermined angle, respectively, so that a beam spot SP of the laser beam $L_M/L_C$ and/or guide beam $L_G$ scans a surface of the workpiece W.

Figure 4:
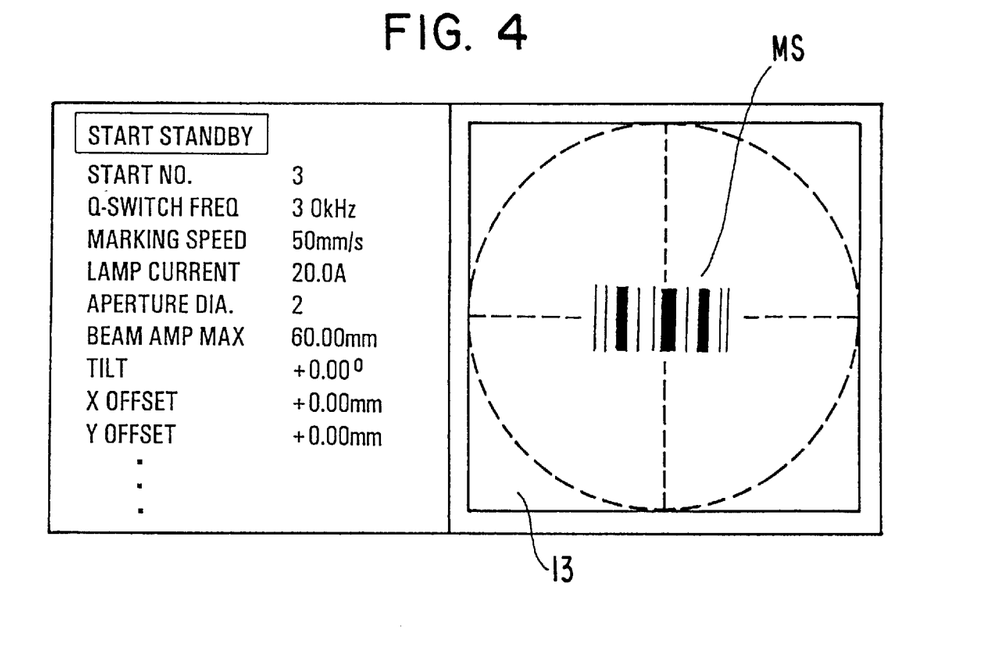
FIG. 4 is a view of a data setting screen displayed on a display in the control power supply unit of the embodiment.

FIG. 4 illustrates a data setting screen displayed on the display 13 in the control power supply unit 10. At left and top of the screen, a present mode of operation (start standby mode, here in FIG. 4) is displayed. Below the present mode, a start number specifying a schedule of marking operation is displayed. Below it, condition data of the marking operation of the start number, including Q-switch frequency, marking speed, lamp current, aperture diameter, etc., are displayed in a list. At right of the screen, an image MS corresponding to the drawing data and representative of the mark pattern for the start number is displayed on an X-Y coordinate. The illustrated bar code has been set as the mark pattern MS for the start No.3.

Figure 5:
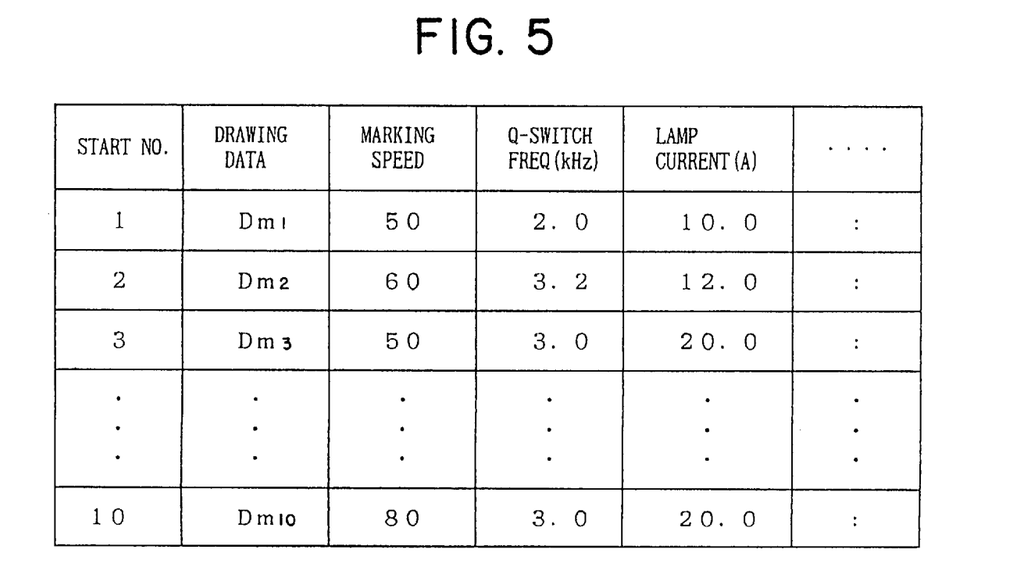
FIG. 5 is a table showing a data managing format of set data of the embodiment.

A ROM in the control 38 stores "data setting" mode software for inputting and setting drawing data and condition data specifying a desired pattern for each start number, and "marking execution" mode software for executing marking operation for each start number, etc. A RAM in the control 38 or external storage device stores drawing data and condition data set for each start number at predetermined locations, as illustrated in FIG. 5.

In accordance with the invention, the ROM and the RAM in the control 38 further store cleaning software and condition data (set values), respectively, for executing a "cleaning" mode, as will be described.

In addition to the "start standby" mode shown in FIG. 4, the laser marking apparatus can operate in other modes including "data setting" mode, "marking execution" mode, and "cleaning" mode of the invention. The "cleaning" mode is made up of two modes, i.e., "pattern tracing-type cleaning" mode for cleaning only a mark portion on a surface of a workpiece corresponding to a mark pattern and "area sweeping-type cleaning" mode for cleaning a desired area almost entirely including the mark portion. The keyboard or mouse of the input unit 42 can be used to enter a command to select a desired mode.

The mark portion refers to a portion to be marked on a surface of a workpiece before the marking and to a marked portion after the marking.

Figure 6:
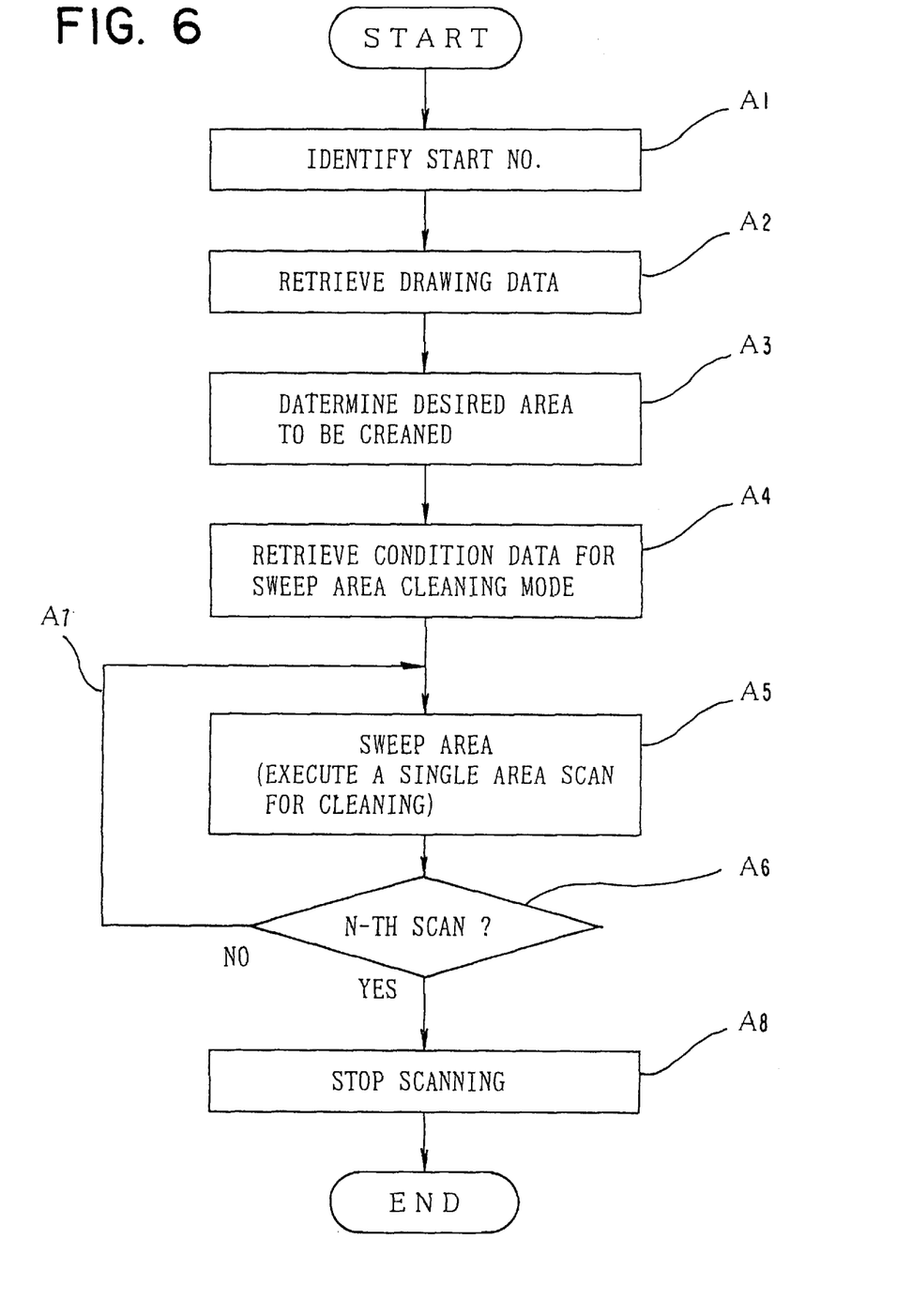
FIG. 6 is a flowchart showing an operation of the control of the embodiment for an "area sweeping-type cleaning" mode.
Figure 7A:
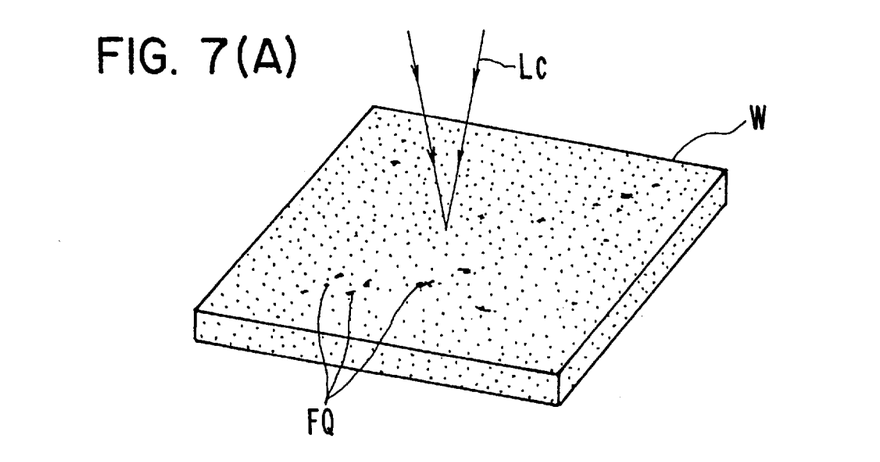
FIGS. 7A and 7B illustrates how the "area sweeping-type cleaning" is performed in the embodiment.

FIG. 6 is a flowchart showing an operation of the control 38 in the "area sweeping-type cleaning" mode. Normally, the "area sweeping-type cleaning" mode is performed before the "marking execution" mode. FIG. 7 illustrates how the "area sweeping-type cleaning" mode is performed. In FIG. 7A, FQ, such as dirt, flaw and unevenness (referred to as FQ, such as dirt) are scattered over the surface of a workpiece W. At the beginning, the guide beam $L_G$ is projected onto the workpiece W to position it on the workbench 18.

When entering the "area sweeping-type cleaning" mode from the condition shown in FIG. 4, the control 38 first identifies the start number (No.3) presented on display screen 13 (step A1) and then retrieves drawing data Dm3 (image data of bar code MS) of the start number (No.3) from memory (step A2). It retrieves coordinate data of the drawing position as well.

Figure 9:
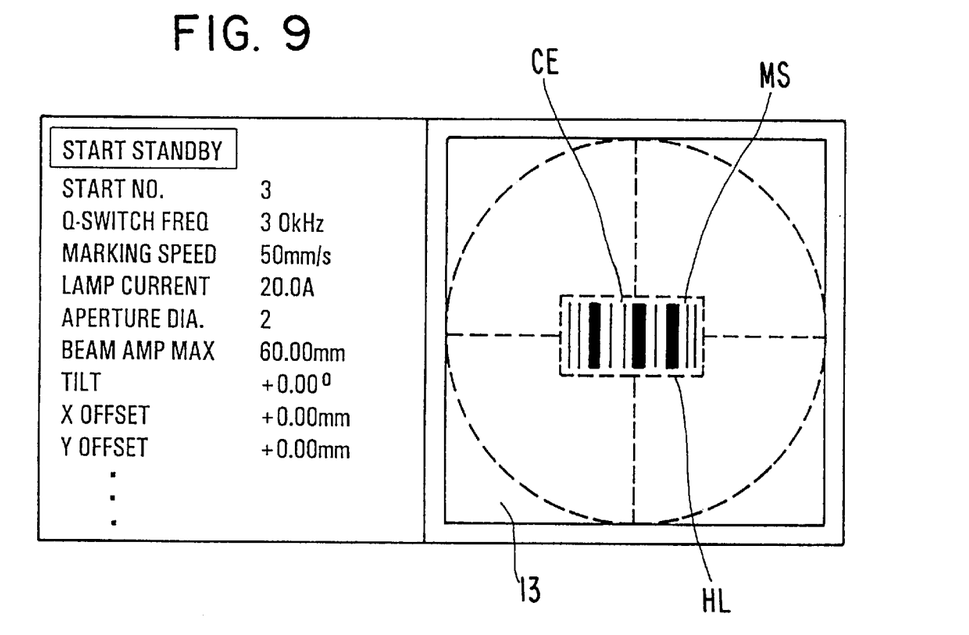
FIG. 9 is a view of a display screen example displayed in the "area sweeping-type cleaning" mode of the embodiment.
Figure 10:
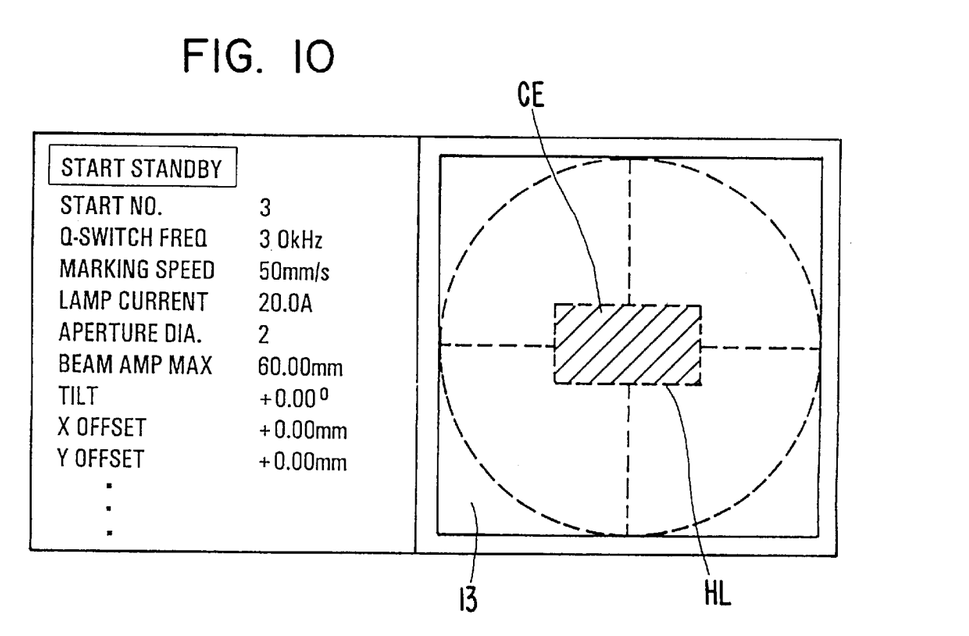
FIG. 10 is a view of another display screen example displayed in the "area sweeping-type cleaning" mode of the embodiment.

Next, the control 38 determines a desired area CE to be cleaned from the retrieved drawing data Dm3 and the drawing position data according to a predetermined formula (step A3). For instance, in FIG. 9, a line HL surrounds the mark pattern MS. The interior of the surrounding line HL may define a domain or area CE to be cleaned. During the "area sweeping-type cleaning" mode, the display screen 13 may present an image or surrounding line of the area CE to be cleaned, either together with the image of the mark pattern MS, as shown in FIG. 9, or singly, without the image of the pattern MS, as shown in FIG. 10. In the case of FIG. 10, the area CE to be cleaned may be presented in color.

Next, the control 38 retrieves condition data (set values) including data, such as scanning speed, for the "area sweeping-type cleaning" mode (step A4).

A scanning speed of the "area sweeping-type cleaning" mode is chosen much higher (e.g., 100 to 1000 times higher than a scanning (marking) speed of the marking mode) for the same or similar beam intensity (laser power) for the YAG laser marking beam $L_M$ and the cleaning beam $L_C$. Thus, the laser energy of the cleaning beam $L_C$ supplied to a workpiece surface per unit area by a single scan in the "area sweeping-type cleaning" mode is $1/1000$ to $1/100$ times lower than the laser energy of the marking beam $L_M$ supplied per unit area by a single scan in the "marking execution" mode.

Figure 8:
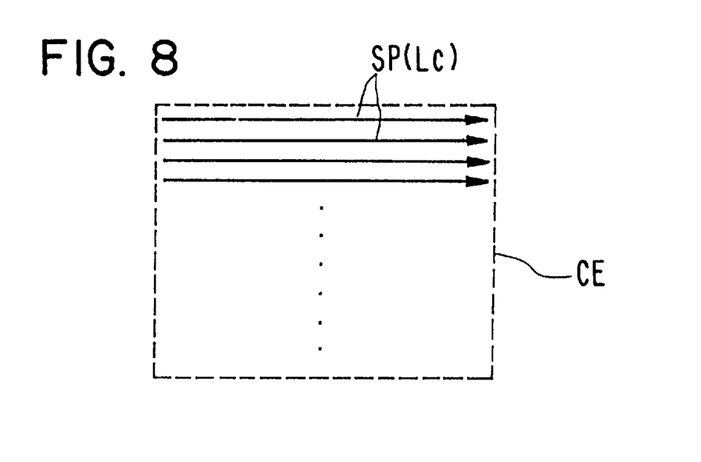
FIG. 8 illustrates cleaning beam spot scanning employed in the "area sweeping-type cleaning" mode of the embodiment.

After the step A4, the control 38 turns on the YAG laser cleaning beam $L_C$ and the guide beam $L_G$ by respectively activating the YAG laser oscillator 22 and He—Ne laser 24 by the YAG laser power supply 34 and the He—Ne laser power supply 36. At the same time, the control 38 sends a scanning control signal meeting the desired area CE to be cleaned, as determined in the step A3, and the condition data including data, such as scanning speed, to the scanning head 20 to thereby perform a single scan in which the beam spot SP of the YAG laser beam $L_C$ almost entirely scans or sweeps the area to be cleaned, area CE of the workpiece W surface, as shown in FIG. 8 (step A5). The single scan repeats the predetermined number of times (N times) in the loop of step A5→A6→A7→A5.

By receiving the YAG laser energy of the cleaning beam $L_C$, workpiece surface materials in the area CE are thinly and lightly melted or sublimated so that FQ, such as dirt, are cleared from the area CE as if with an eraser. Since the YAG laser energy of the cleaning beam $L_C$ supplied to unit area of the area CE of the workpiece surface is much lower than that of the marking beam $L_M$, no mark is formed in the area CE. A degree of the cleaning (cleaning effect) not only depends on the scanning speed but also depends on the intensity of the YAG laser beam $L_C$ and the number of scans (N). The intensity of YAG laser beam $L_C$ can be controlled by adjusting the Q-switch frequency or lamp current.

Having performed a predetermined number (N) of area cleaning scans, the control 38 stops the scanning control signal and, at the same time, turns off the YAG laser beam $L_G$ and the guide beam $L_G$ (step A8). Since the guide beam $L_G$ is visible whereas the YAG laser beam $L_C$ is invisible, the cleaning scan can be confirmed by eye using the visible guide beam $L_G$ together with the YAG laser beam $L_C$ for cleaning.

Figure 7B:
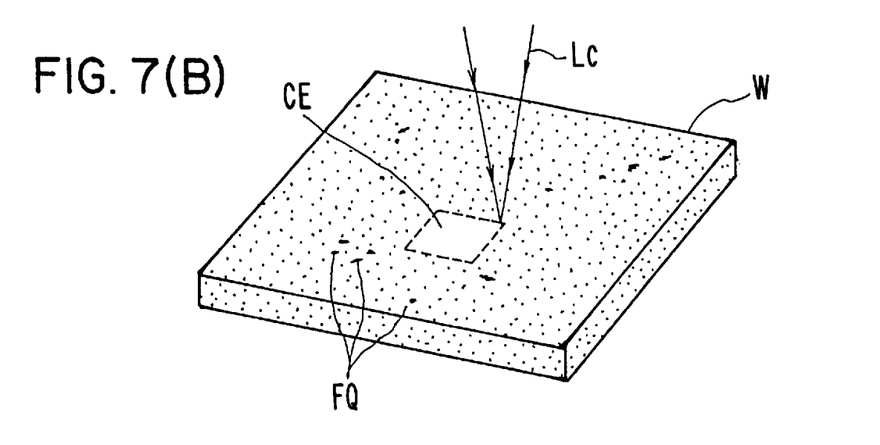

In this manner, the "area sweeping-type cleaning" mode can be performed before the "marking execution" mode. In the "area sweeping-type cleaning" mode, the YAG laser cleaning beam $L_C$ having a predetermined intensity scans a desired area CE to be cleaned, covering a mark portion MS of the workpiece surface as many as a predetermined times and at a predetermined scanning speed so that FQ such as dirt, is almost completely cleared from the area CE to be cleaned. As a result, base material of the workpiece is exposed in the area CE which thus appears to be polished, as shown in FIG. 7B.

The "area sweeping-type cleaning" mode employs, as object of scan, an area CE more extensive than the mark portion MS. The area CE that is to be cleaned is, however, set in a simple shape such as a rectangle. Thus, the cleaning process can be performed in a short time using high speed and smooth scanning operation.

Figure 11:
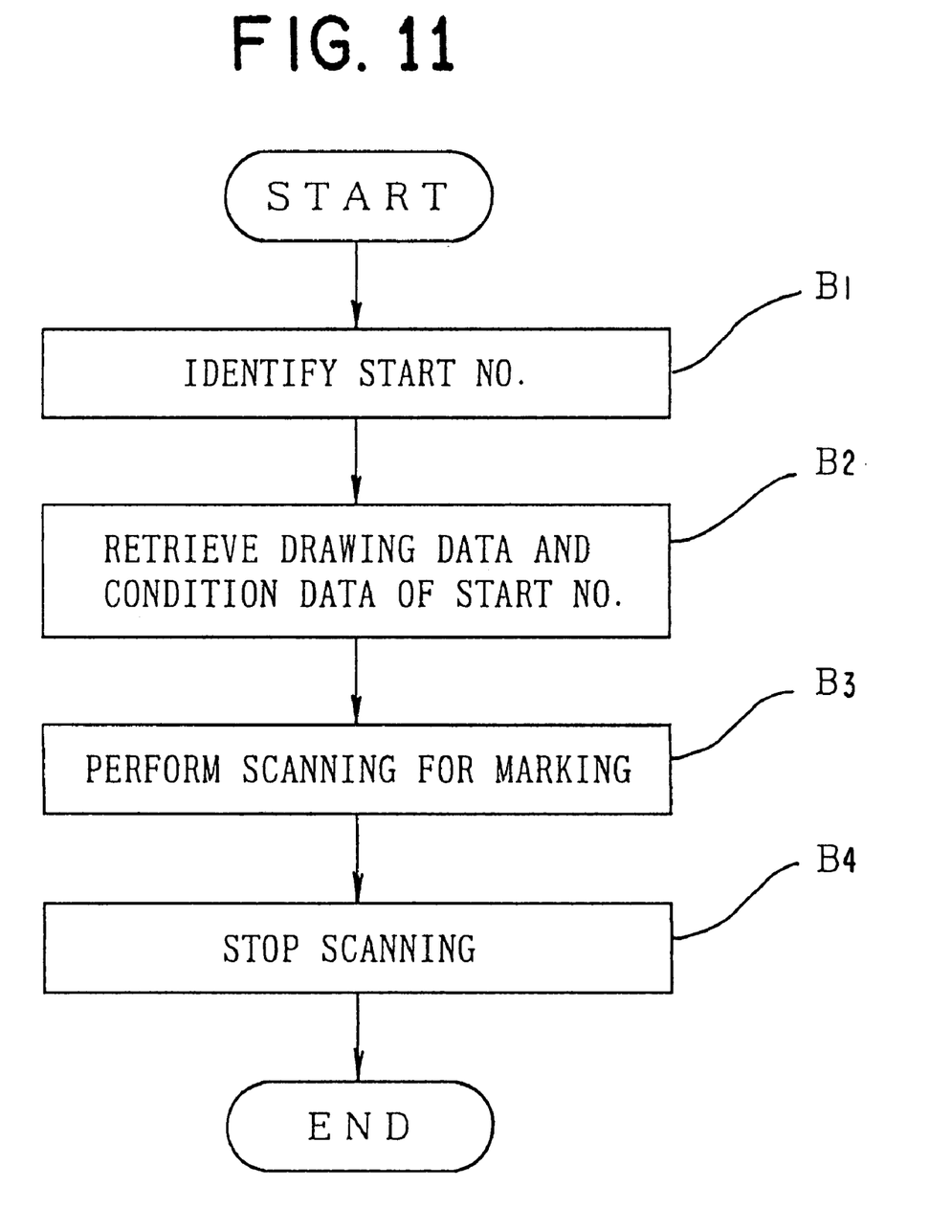
FIG. 11 is a flowchart showing an operation of the control of the embodiment for a "marking execution" mode.

FIG. 11 is a flowchart showing an operation of the control 38 in the "marking execution" mode. The "marking execution" mode may be entered after finishing the "area sweeping-type cleaning" mode described in connection with FIG. 7.

When entering the "marking execution" mode, the control 38 first identifies the start number (No.3) presented on display screen 13 (step B1) and then retrieves drawing data Dm3 (image data of bar code MS) of the start number (No.3) and condition data (Q-switch frequency, marking speed, etc.,) from memory (step B2).

Next, the control 38 turns on the YAG laser marking beam $L_M$ and the guide beam $L_G$ by respectively activating the YAG laser oscillator 22 and He—Ne laser 24 by the YAG laser power supply 34 and the He—Ne laser power supply 36. At the same time, the control 38 sends a scanning control signal meeting the drawing data and other condition data to the scanning head 20 to thereby perform a single scan in which the beam spot SP of the YAG laser beam $L_M$ and guide beam $L_G$ draws the pattern MS (bar code) of the start number (No.3) within the cleaned area CE of the workpiece W surface (step B3).

Figure 13:
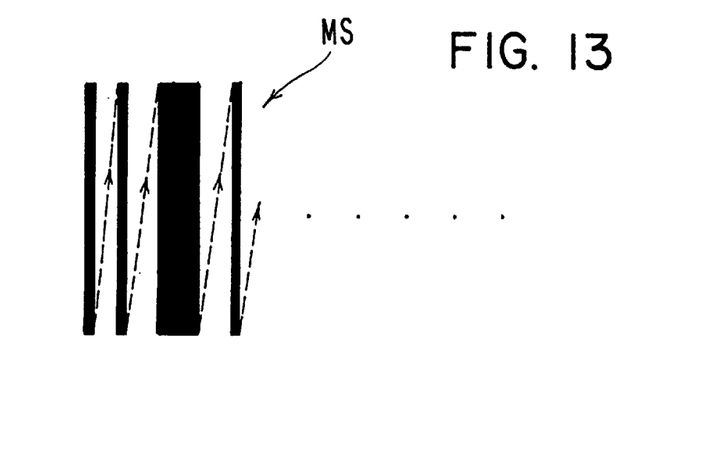
FIG. 13 illustrates marking beam scanning employed in the "marking execution" mode of the embodiment.

In the marking scanning, the beam spot SP of the YAG laser marking beam $L_M$ traces or draws a mark pattern MS, as shown in FIG. 13. In the example of FIG. 13, a heavy bar in the bar code pattern is formed by successively shifting scan lines of beam spot SP by units.

Figure 12A:
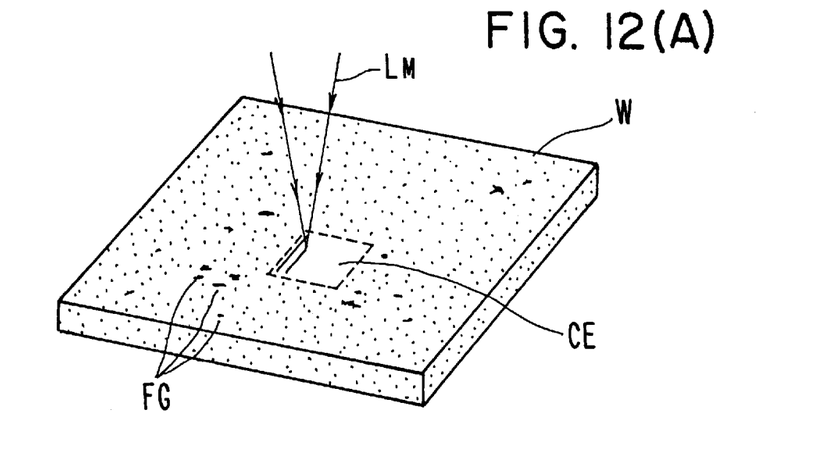
FIGS. 12A and 12B illustrate how the marking is performed in the "marking execution" mode of the embodiment.
Figure 12B:
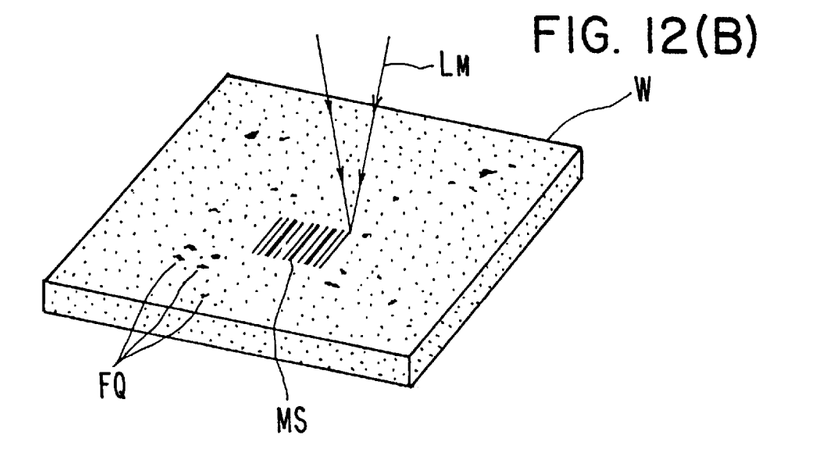

In the scanning operation, a point on the workpiece W surface within the cleaned area CE free from FQ, such as dirt, where the beam spot of the YAG laser beam $L_M$ hits, is instantly sublimated or altered in color by the laser beam energy. As a result, the pattern (bar code) MS is clearly marked, as shown in FIG. 12B.

Since the beam spot of the visible (red) guide beam $L_G$ traces the same pattern as that of the beam spot of the invisible (infrared) YAG laser beam $L_M$, the marking scan can be confirmed by eye.

Normally, the marking process is completed by a single scan. Thus, after the single scan, the control 38 stops the scanning control signal and, at the same time, turns off the YAG laser beam $L_M$ and the guide beam $L_G$ to terminate the marking scan (step B4).

As stated, the "area sweeping-type cleaning" mode cleans a desired area CE including a mark portion of the workpiece W surface. After that, the "marking execution" mode is entered to execute marking. Thus, the present apparatus can clearly and efficiently mark the cleaned area CE with a desired pattern.

Figure 14:
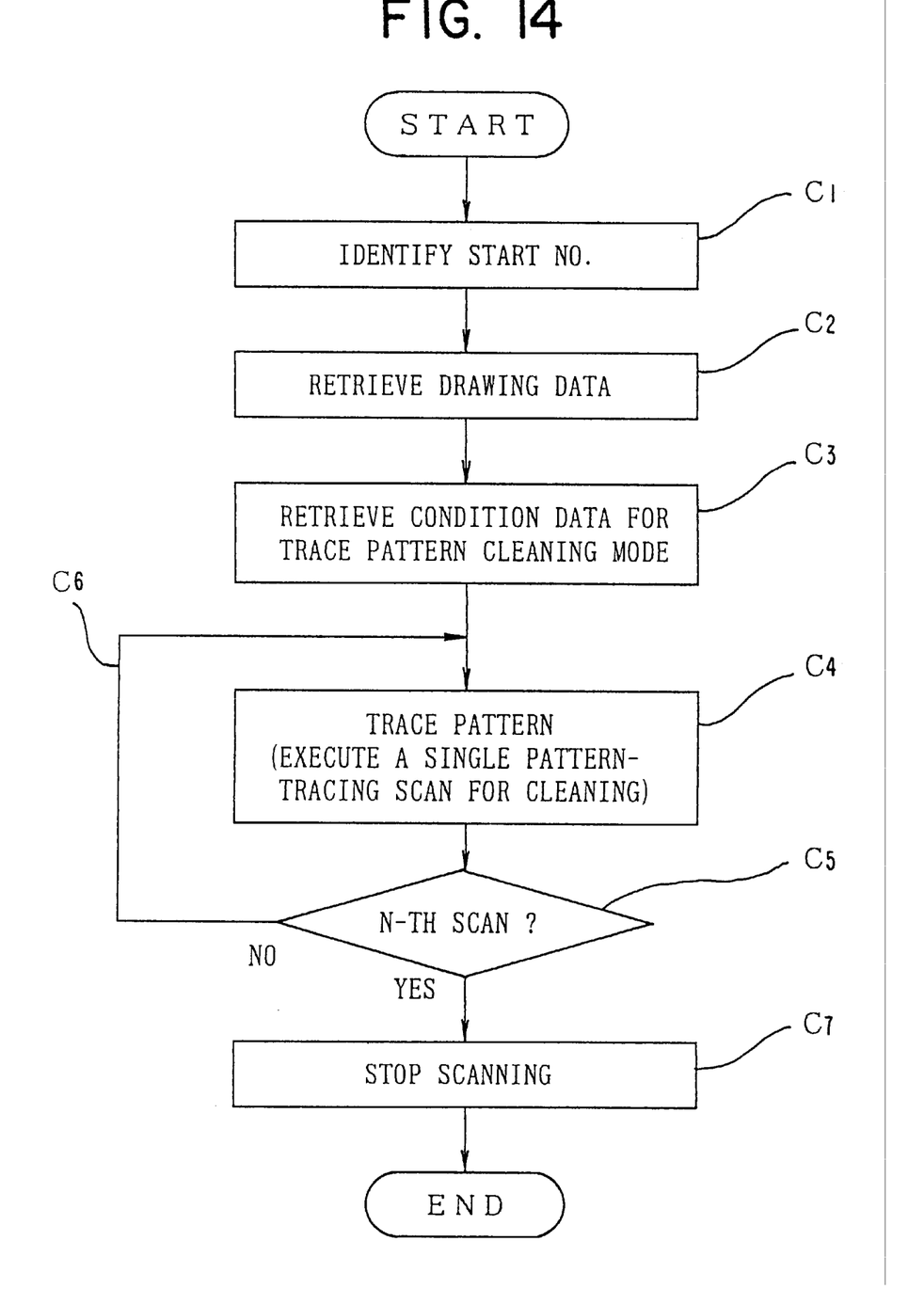
FIG. 14 is a flowchart showing an operation of the control of the embodiment for a "pattern tracing-type cleaning" mode.

FIG. 14 is a flowchart showing an operation of the control 38 in the "pattern tracing-type cleaning" mode. FIG. 15 illustrate how the "pattern tracing-type cleaning" mode is applied for preference.

Figure 15A:
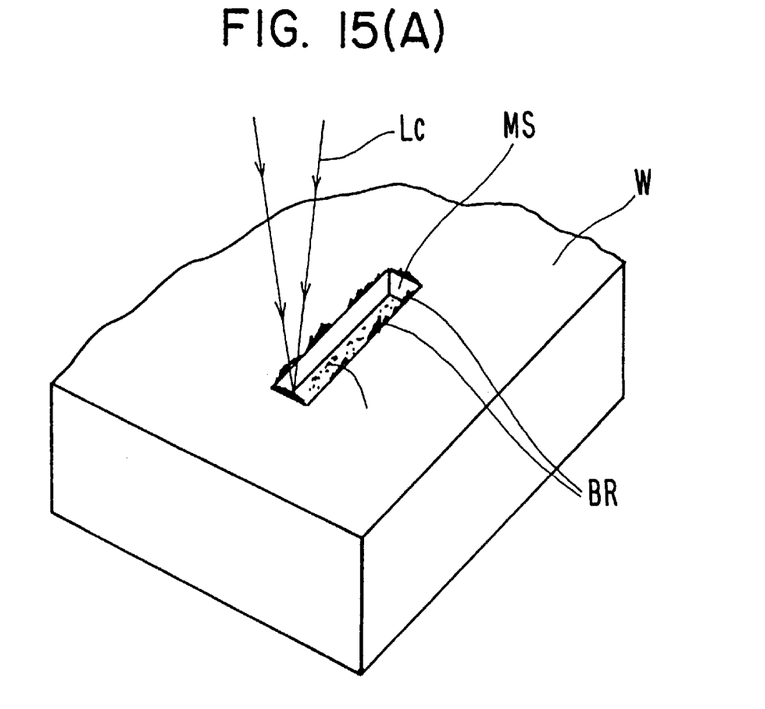
FIGS. 15A and 15B illustrate how the "pattern tracing-type cleaning" is performed in the embodiment.
Figure 15B:
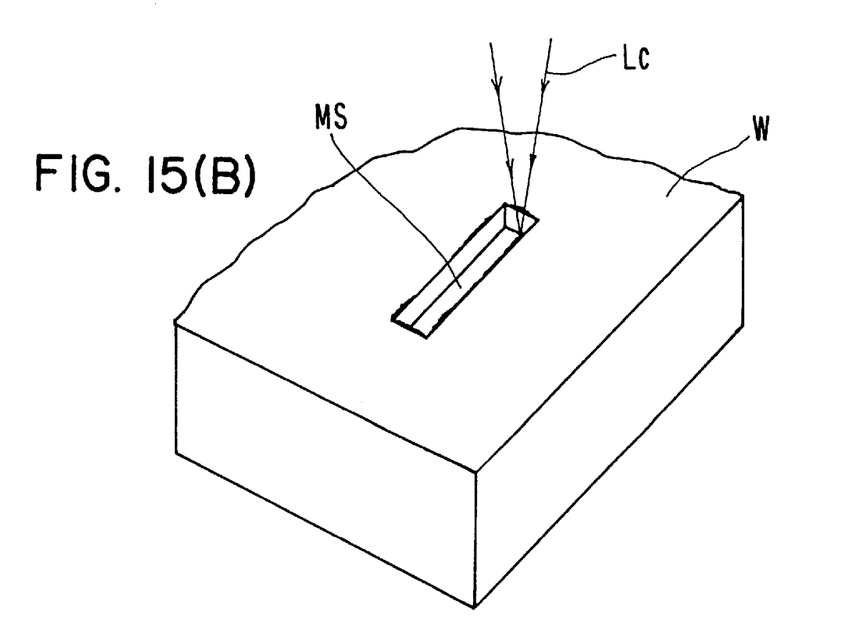

In FIG. 15A, as a result of the "marking execution" mode, a deeply etched pattern MS has been formed on the workpiece W surface whereas GR, such as dust and slag, pro-
duced in the marking process remain in a groove of the mark MS and BG, such as burrs, are formed on groove edges. Immediately after the marking process of such deep engraving, i.e., in the condition in which the workpiece W remains at the same position on the workbench 18, the mode may be switched from the "start standby" mode to the "pattern tracing-type cleaning" mode.

When entering the "pattern tracing-type cleaning" mode, the control 38 first identifies the start number (No.3) presented on display screen 13 (step C1) and then retrieves drawing data Dmi of the start number from memory (step C2). It retrieves coordinate data of the drawing position as well.

Next, the control 38 retrieves the condition data (set values) including data, such as scanning speed for the "pattern tracing-type cleaning" mode (step C3).

Next, the control 38 turns on the YAG laser cleaning beam $L_C$ and the guide beam $L_G$ by respectively activating the YAG laser oscillator 22 and He—Ne laser 24 by the YAG laser power supply 34 and the He—Ne laser power supply 36. At the same time, the control 38 sends a scanning control signal meeting the retrieved drawing data and other condition data to the scanning head 20 to thereby perform a single pattern-tracing scan in which the beam spot SP of the YAG laser cleaning beam $L_C$ traces the mark portion MS (step C4). The pattern-tracing scan repeats the predetermined number of times (N times), as seen in the loop of steps, C4→C5→C6→C4.

By receiving the YAG laser energy of the cleaning beam $L_C$, workpiece surface materials in a groove of the mark are thinly and lightly melted or sublimated so that the GR, such as remaining dirt, slag, or BR, such as burrs are removed from the mark portion.

It is effective for the "pattern tracing-type cleaning" mode to reduce an intensity of the YAG laser cleaning beam $L_C$ (for instance, about 40% of the YAG laser marking beam $L_M$ intensity) rather than to increase the scanning speed. Projecting YAG laser cleaning beam $L_C$ having such small laser energy effectively removes undesired impurities (GR, BR) without forming any appreciable mark. The cleaning degree or effect can also be regulated by changing the number of scans (N).

Having performed the predetermined number (N) of the cleaning scans in succession, the control 38 stops the scanning control signal and, at the same time, turns off the YAG laser beam $L_C$ and the guide beam $L_G$ (step C7).

As a result of the marking of deep etching GR, such as dust, slag or BG, such as burrs are formed on the mark portion MS, as stated. Then, the apparatus puts into operation the "pattern tracing-type cleaning" mode in which the beam spot of the YAG laser cleaning beam $L_C$ scans or traces the mark portion MS, and is thus capable of removing the undesired materials (GR, BG) automatically, effectively and in a short time. Therefore, productivity and quality of the marked products are improved.

For more effective removal of BG, such as burrs, from mark MS edges, the "pattern tracing-type cleaning" mode after the marking can be modified so as to determine the domain of scanning (area to be cleaned) having an extension of the mark portion MS based on the drawing data retrieved in step C2.

For a post-cleaning process after the marking, the present system may select the "area sweeping-type cleaning" mode in place of the "pattern tracing-type cleaning" mode. Conversely, for a pre-cleaning process before the marking, as discussed in connection with FIG. 7, the "pattern tracing-type cleaning" mode may be chosen in place of "area sweeping-type cleaning" mode. In the case of marking a bar code pattern, spaces between bars (mark portion) should also be clean. In such a case, it is preferred to choose the "area sweeping-type cleaning" mode for the pre-cleaning.

In the illustrated embodiment, the YAG laser marking beam $L_M$ and the YAG laser cleaning beam $L_C$ are each provided by a common YAG laser oscillator 22. This is advantageous in terms of apparatus size and cost. If desired, however, the YAG laser marking beam $L_M$ and the YAG laser cleaning beam $L_C$ may individually be provided by separate laser oscillators.

In the illustrated embodiment of YAG laser marking apparatus, a YAG laser oscillator is used for laser oscillator and a He—Ne laser oscillator is used for a guide beam generator. These are illustrative only. The present invention may be practiced using any suitable laser oscillator or any suitable laser beam for marking and cleaning. Either the cleaning mode or the "marking execution" mode may be performed without the need of guide beam.

In accordance with the scanning-type laser marking method and apparatus of the invention, an automatic cleaning process is performed before and/or after the marking. In the cleaning process, a laser beam is projected onto a workpiece so as to scan a desired area corresponding to or including a mark portion of the workpiece surface to thereby clean the desired area or mark portion. Therefore, productivity and quality of marked products can be improved.

What is claimed is:

1. A method for marking a desired pattern of at least one of a character, symbol, and figure on a surface of a workpiece by laser beam scanning, said method comprising:
    projecting a highly focused laser marking beam so as to scan a surface of the workpiece to mark the desired pattern thereon;
    projecting a highly focused laser cleaning beam, having an energy density lower than an energy density of the marking beam, after said projecting of the marking beam such that the cleaning beam scans a marked portion on the surface of the workpiece a preselected number of times so as to clean the marked portion.

2. A method as claimed in claim 1, wherein said projecting of the cleaning beam is performed such that the cleaning beam scans an area extending beyond the marked portion on the surface of the workpiece.

3. An apparatus for marking a desired pattern of at least one of a character, symbol, and figure on a surface of a workpiece by laser beam scanning, said apparatus comprising:
    an input device operable to input data of an image and position of the pattern to said apparatus;
    a cleaning area determining device, linked with said input device, operable to determine, from the data input by said inputting device, a desired cleaning area including a desired portion corresponding to the pattern on the surface of the workpiece;
    a marking device, linked with said input device, operable to project a laser marking beam so as to scan the surface of the workpiece so as to mark the desired pattern thereon; and
    a cleaning device, linked with said cleaning area determining device, operable to project a laser cleaning beam, having an energy density lower than an energy density of the marking beam, so as to scan the desired cleaning area determined by said cleaning area determining device.

4. An apparatus as claimed in claim 3, further comprising:
    a guide beam projector, linked with said input device, operable to project a visible guide beam together with the laser cleaning beam so that the scanning of the cleaning beam can be confirmed by eye.

5. An apparatus as claimed in claim 3, wherein said cleaning device is operable to repeat the projecting and scanning of the cleaning beam a preselected number of times so as to regulate a degree of cleaning.

6. An apparatus for marking a desired pattern of at least one of a character, symbol, and figure on a surface of a workpiece by laser beam scanning, said apparatus comprising:
    an input device operable to input data of an image and position of the pattern to said apparatus;
    a cleaning portion determining device, linked with said input device, operable to determine, from the data input by said inputting device, a desired portion corresponding to the pattern on the surface of the workpiece;
    a marking device, linked with said input device, operable to project a laser marking beam so as to scan the surface of the workpiece so as to mark the desired pattern thereon; and
    a cleaning device, linked with said input device, operable to project a laser cleaning beam, having an energy density lower than an energy density of the marking beam, so as to scan the desired portion on the surface of the workpiece determined by said cleaning portion determining device.

7. An apparatus as claimed in claim 6, further comprising:
    a guide beam projector, linked with said input device, operable to project a visible guide beam together with the laser cleaning beam so that the scanning of the cleaning beam can be confirmed by eye.

8. An apparatus as claimed in claim 6, wherein said cleaning device is operable to repeat the projecting and scanning of the cleaning beam a preselected number of times so as to regulate a degree of cleaning.

9. An apparatus for marking a desired pattern of at least one of a character, symbol, and figure on a surface of a workpiece by laser beam scanning, said apparatus comprising:
    input means for inputting data of an image and position of the pattern to said apparatus;
    cleaning area determining means for determining, from the data input by said inputting device, a desired cleaning area including a desired portion corresponding to the pattern on the surface of the workpiece;
    marking means for projecting a laser marking beam and scanning the surface of the workpiece with the laser marking beam so as to mark the desired pattern on the surface of the workpiece; and
    cleaning means for projecting a laser cleaning beam, having an energy density lower than an energy density of the marking beam, and scanning the desired cleaning area determined by said cleaning area determining device with the laser cleaning beam.

10. An apparatus as claimed in claim 9, further comprising:
    means for projecting a visible guide beam together with the laser cleaning beam so that the scanning of the cleaning beam can be confirmed by eye.

11. An apparatus as claimed in claim 9, wherein said cleaning means is operable to repeat the projecting and scanning of the cleaning beam a preselected number of times so as to regulate a degree of cleaning.

12. An apparatus for marking a desired pattern of at least one of a character, symbol, and figure on a surface of a workpiece by laser beam scanning, said apparatus comprising:

input means for inputting data of an image and position of the pattern to said apparatus;

cleaning portion determining means for determining, from the data input by said inputting device, a desired portion corresponding to the pattern on the surface of the workpiece;

marking means for projecting a laser marking beam and scanning the surface of the workpiece with the laser marking beam so as to mark the desired pattern on the surface of the workpiece; and     cleaning means for projecting a laser cleaning beam, having an energy density lower than an energy density of the marking beam, and scanning the desired portion on the surface of the workpiece determined by said cleaning portion determining device with the laser cleaning beam.

13. An apparatus as claimed in claim 12, further comprising:

means for projecting a visible guide beam together with the laser cleaning beam so that the scanning of the cleaning beam can be confirmed by eye.

14. An apparatus as claimed in claim 12, wherein said cleaning means is operable to repeat the projecting and scanning of the cleaning beam a preselected number of times so as to regulate a degree of cleaning.

\* \* \* \* \*